Nov. 14, 1967   D. H. FRANTZ, JR., ET AL   3,353,149
ACOUSTIC RANGING SYSTEM
Filed March 30, 1966

INVENTORS
DAVID H. FRANTZ, JR.
DAVID D. KETCHUM
BY
Robert J. Schiller
ATTORNEY

# United States Patent Office 3,353,149
Patented Nov. 14, 1967

3,353,149
ACOUSTIC RANGING SYSTEM
David H. Frantz, Jr., West Tisbury, and David D. Ketchum, Falmouth, Mass., assignors to Ocean Research Equipment, Inc., Falmouth, Mass., a corporation of Massachusetts
Filed Mar. 30, 1966, Ser. No. 538,623
6 Claims. (Cl. 340—3)

ABSTRACT OF THE DISCLOSURE

An acoustic ranging system in which an acoustic generator and receiver are mounted on shipboard and an acoustic transponder is suspended from a cable below the ship, the transponder generating an acoustic signal responsively to acoustic signals received from the generator. The receiver then receives sound signals directly from the transponder and the bottom echoes of the sound generated both by the transponder and the generator, thereby allowing the distances between the ship, transponder and bottom to be determined readily.

---

This invention relates to acoustic detection and location systems, and more particularly to a method and device for determining the relative positions of underwater objects.

A number of systems are known whereby one can monitor the position of an object in a large body of water. Typically, such systems depend upon the measurement of the time interval required for a pulse of sonic energy to travel underwater between two or more points. To the extent that the speed of the sound in water (ca. 4800 feet per second) is known, the time interval can be translated into distance. Such systems are commonly used to determine depth of water beneath a vessel by clocking the total time required for a sonic pulse to travel from the vessel to the sea bottom and for an echo to return to an onboard detector. A similar system has also been disclosed using a device disposed between the surface and bottom of a body of water for determining the distance from the surface to the device and to the bottom. For example, in U.S. Patent No. 3,119,092 issued Jan. 21, 1964 to H. E. Edgerton, there is shown a system incorporating an acoustic generator or bottom-finding pinger suspended on a cable which allows the pinger to be raised or lowered from a ship. A pulse from the pinger is transmitted simultaneously through water toward the ship and toward the bottom. Receiving gear on the ship responds to the pulse as directly received from the pinger and also the pulse echo received from the sea bottom. The distance between the bottom and the pinger is readily computed from this information.

The latter system is subject to a number of problems. For example, if the pinger is synchronized with the onboard equipment by electrical signals from a common clock through the cable, the latter of necessity must incorporate electrical conductors insulated from the sea water. Long lengths of cable combining mechanical strength members and conductors are expensive, unwieldy, and can present rather high electrical impedances. These problems are avoided if one employs a free-running, i.e. self-powered pinger; because the function of the cable becomes merely one of support, it can be of simpler construction.

However, with a free-running pinger, it is necessary to provide a very precise time base built into the pinger because the pinger signals must be synchronized accurately with the sweep cycle of an indicator device such as a recording drum or an oscillograph. Additionally, free-running bottom-finding pingers of the type disclosed in the aforementioned patent must be suitably matched or synchronized to the calibration of the indicator, the latter usually being calibrated either in the metric or the English system of units. Lastly, if the ship is stationary, as a well-synchronized pinger is lowered and is pulsed, the indicator will show, for example on a recording strip, two lines which converge upon one another with substantially identical but opposite slopes. The lateral displacement of the lines from one another at a given strip location will be indicative of the distance of the pinger from the bottom. Obviously, it is quite difficult to print on such a strip, calibrations whereby the distance of the pinger from the bottom can be directly read. Further, such a strip gives no information with respect to the depth of the pinger or the bottom beneath the vessel. Necessarily, additional sounding equipment is required if this additional information is desired.

Also, if the recorder or indicator is operated at full scale (e.g. a twelve-inch sweep requiring 10 seconds and representing 4000 fathoms), as the two indicia approach one another resolution becomes very difficult. Furthermore, since an acoustic pulse is transmitted only once every 10 seconds, this period represents the maximum rate at which pinger information could be meaningfully received. Therefore, typically the recorder is switched to an expanded scale so that full scale now represents, say 400 fathoms or a 1 second sweep. Unfortunately, if the pinger is free-running, the lines of indicia representing the free-running pinger signal may lie to either side of the line of indicia representing the echo of the pinger, or the two lines may even be coincident with one another if the pinger is stationary with respect to the bottom. The two lines will converge on one another and cross every 400 fathoms that the pinger is lowered.

The present invention has as a principal object the provisions of an acoustic system which overcomes the aforementioned problems of the prior art in a simple, comparatively inexpensive manner.

Another object of the present invention is to provide a novel acoustic distance-finding means comprising standard acoustic echo-sounding gear mounted in a ship, an acoustic transponder and means for variably suspending the transponder below the ship.

Yet another object of the present invention is to provide a new and improved method of and means for determining the distance of submerged objects from a particular under-water boundary or surface.

Generally to effect these and other objects, a first pulse of acoustic energy is transmitted from the ship and upon receipt thereof by a transponder coupled to the submerged object, the transponder provides another acoustic pulse which is transmitted substantially synchronously with the first pulse toward, for example, both the ship and toward the sea bottom.

Other objects of the invention will in part be obvious and will in part appear hereinafter. The invention accordingly comprises the apparatus possessing the construction, combination of elements, and arrangement of parts, and the several steps and the relation of one or more of such steps with respect to each of the others all of which are exemplified in the following detailed disclosure, and the scope of the application of which will be indicated in the claims.

Figure 1:
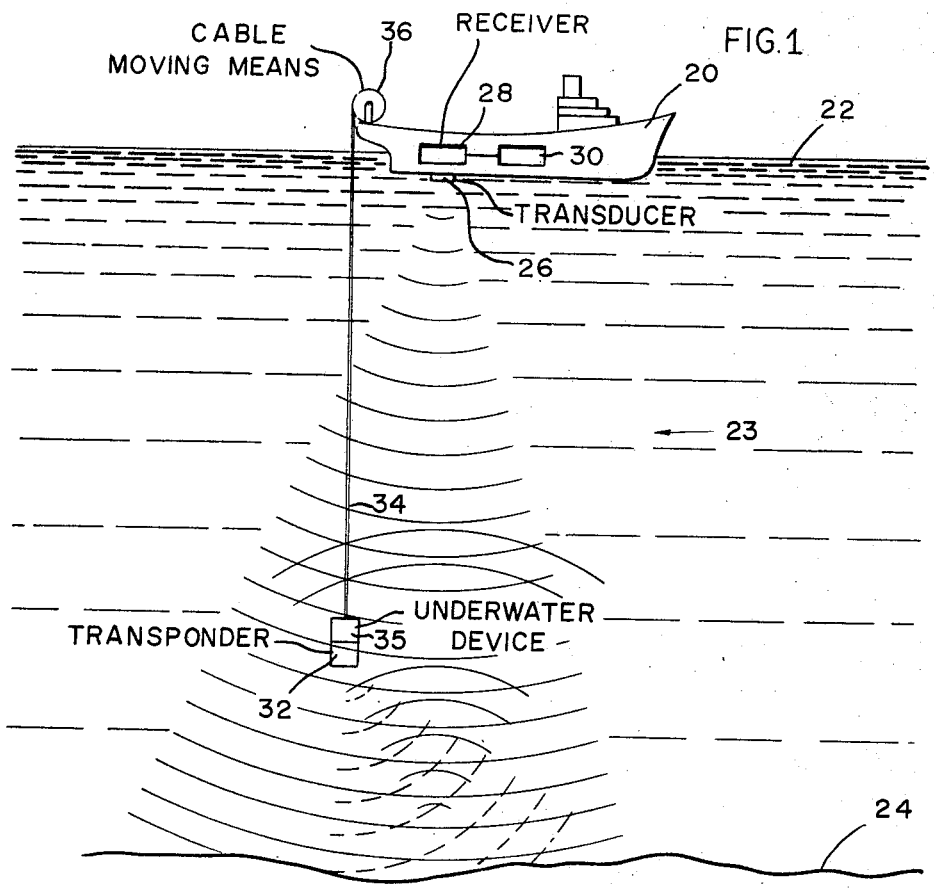
FIG. 1 is a side elevation of the invention as used in underwater measurements.

Referring to the drawing there is shown a ship or other surface vessel 20 floating on the surface 22 of a body of water 23 above sea bottom 24. Ship 20 contains well known standard echo sounding apparatus, such as that provided by Edo Corporation, New York under the trade designation of Edo Model 185 and described in a brochure published by that organization.

The echo-sounding gear typically comprises transducer 26 fixed to the hull of ship 20 or suspended from it; oscillator-amplifier 28 electrically coupled to transducer means 26, and recording device 30, such as an oscillograph. In a preferred embodiment, transducer means 26 is a standard piezoelectric device which, when excited properly by oscillatory signals from oscillator-amplifier 28, will yield an acoustic signal output. Conversely, when transducer means 26 is excited by an acoustic wave-train in the water, it will provide an electrical signal output. Recording device 30 is typically a chart or strip-recorder type of device in which a paper strip is advanced at a predetermined rate and which employs, for example, a stylus or light beam repetitively swept across the strip normally to the direction of strip advancement, at a predetermined repetition rate and a predetermined speed, thereby to form indicia on the strip on a known time base.

The present invention also includes acoustic transponder 32 secured to or mounted on one end of cable 34, adjacent device 35, the position of which is to be determined. Typically device 35 is a water-sampling bottle, an underwater camera or the like. The other end of cable 34 is connected to ship 20, for example, to support reel 36, onto and off of which the cable can be selectively wound to raise or lower the transponder. Transponder 32 can be a commercially available device such as the acoustic transponder Model #450 sold by Ocean Research Equipment, Inc., Massachusetts or the sonar transponder Model 2955 sold by Alpine Geophysical Associates, Inc. of New Jersey. These transponders typically will reply, i.e., provide an output signal, when stimulated or interrogated by a pulse from a ship's sonar transducer. Generally, they include wholly self-contained power sources, such as necessary batteries, one or more piezoelectric acoustical transducers, and associated circuitry for detecting a pulse and for responsively activating its transducer to emit an answering pulse.

In operation, transponder 32 with device 35 is lowered from the station provided by ship 20 into the water beneath the vessel. Oscillator-amplifier 28 is energized and therefore will periodically pulse transducer means 26, generating a sonic pulse, for example 12 kc. for 5 milliseconds at a repetition rate of 1 pulse per second. This pulse propagate through the water to transponder 32 at a known velocity and upon recepit by the transponder, stimulates or activates the latter to emit a similar pulse. If the transponder output is simultaneous with its receipt of the signal from the sonar transducer, both pulses will propagate toward the ocean bottom together, and will provide a pair of simultaneous echoes that can be detected by the sonar transducer. If, as is more usual, there is a small delay between input stimulus and output response of the transponder, a double echo will be reflected from the bottom. For example, if the transponder delay is about 5 milliseconds, the bottom echoes will be spaced about 25 feet apart.

The echo or echoes are received by transducer means 26 and displayed on recording device 30, as are the original pulse from the transponder. Thus, device 30 will indicate on its chart at least two contemporaneous indicia for each sweep. One of these indicia indicates the time of transit of a first signal, such as a ping or pulse, from sonar transducer 26 to the bottom and back.

The other of these indicia indicates the time of receipt at the station of a signal from transponder 32 in response to that first signal. The distance of both bottom and transponder from the station are readily computed from this time information, typically by calibrating the moving recorder strip in distance increments.

Thus, assuming a recording device comprising a stylus which moves or sweeps laterally across an elongated strip which is advanceable axially, the recorder usually will provide at the beginning of a sweep, a base indicium simultaneously with a first pulse generated by transducer 26. If the transponder is suspended between transducer 26 and the bottom, the stylus will continue its sweep for the total period of time required for the first pulse to propagate to transponder 32 to trigger the output or second pulse from the latter, and for that second pulse to be received and recorded by the stylus as another indicium on the strip. The stylus continues its sweep until the next indicium is recorded indicating the receipt of an echo from the bottom of the first pulse or of both pulses if substantially simultaneous.

Figure 2:
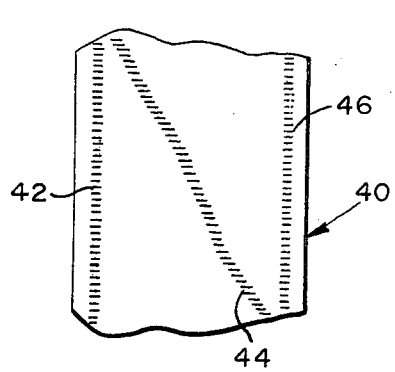
FIG. 2 is an exemplary recording tape showing the indicia provided by the invention.

Referring now to FIG. 2 there will be seen an idealized series of such indicia formed on a recorder strip moved axially during the progressive lowering of a transponder toward the bottom from a static station.

As will be seen (assuming a stylus movement from left to right across strip 40) a series of indicia 42 lie along the left-hand margin of strip 40 indicating a base line or surface position. As transponder 32 is lowered, a series of indicia 44 are created by pulses from the transponder, delineating a line diverging from indicia 42. The distance (calibrated across the strip) between corresponding points on each series of indicia can be read easily and is the distance between the vessel and the transponder. Similarly, because the station or vessel is static, the bottom distance remains unchanged and the echoes from the bottom (assuming the transponder output to be simultaneous, with the arrival of the sonar pulse from the vessel at the transponder) will form a series of indicia 46 lying in a straight line paralleling the right-hand margin of strip 40. Thus, on a single strip, the distances of the transponder with associated device 25 the bottom and the vessel from each other can be directly and simply indicated.

Figure 3:
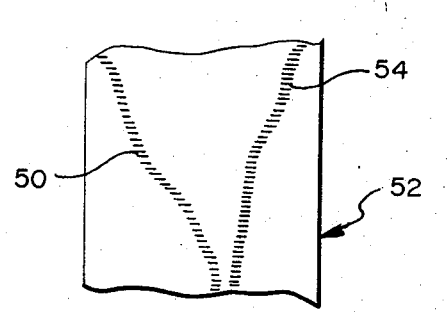
FIG. 3 is another exemplary recording tape showing the comparative indicia provided by a prior art device.

In distinction, as shown in FIG. 3 where the prior art uses a bottom-finding pinger, operative not responsively to an acoustic pulse propagated to the transponder from the sonar transducer, but as a free-running pinger, the resulting strip record is difficult to interpret, and has less information. As shown, the direct signals from the free-running pinger, as the latter is lowered, provide a series of indicia 50 in a line diverging from the left hand margin of strip 52. The series of indicia 54 provided by the reflected signals from the bottom will then define a line diverging from the right hand margin. Because both series of indicia 50 and 54 tend to converge on lowering of the pinger (or diverge on raising the pinger), the strip cannot be read with the facility with which the strip provided by the present invention can be read, nor will it provide a proper indication of the depth of the bottom from the ship or station from which the pinger is suspended.

Since certain changes may be made in the above apparatus and methods without departing from the scope of the invention herein involved it is intended that all matter contained in the above description or shown in the accompanying drawing shall be interpreted in an illustrative and not in a limiting sense.

What is claimed is:

1. Method of measuring the position of a device submerged in a body of water from both the upper surface and the bottom of said body, said method comprising the steps of;

transmitting a first acoustic pulse toward said bottom from a station adjacent said surface;

positioning between said surface and said bottom said device;

generating adjacent said device a second pulse upon arrival at said device of and responsively to said first pulse following propagation of the latter from said station through said body;

receiving said second pulse and bottom echoes of said first and second pulses at said station; and determining from the received pulse and echoes the distances between said station, device and bottom.

2. Method as defined in claim 1 wherein said step of determining said distances comprises the step of recording at said station;

the instant of transmission of said first pulse;

the elapsed time for receipt of said second pulse after said first pulse; and the elapsed time for receipt of at least the echo of one of said pulses after said first pulse.

3. Method as defined in claim 1 wherein a series of said first pulses are transmitted, and said step of determining said distances comprises the steps of recording on a unit record at said station, the times of transmission of said first pulse the elapsed times of receipt of each of a sequence of second pulses generated responsively to each first pulse;

and the times of receipt of each echo of said first and second pulses from said bottom.

4. Method as defined in claim 3 wherein each of said times is recorded as an indicium of a moving strip chart.

5. Apparatus for indicating the position of a device submerged in a body of water between the upper surface and bottom of said body, said apparatus comprising in combination;

means disposed at a station adjacent the surface of said body for transmitting first acoustic pulses toward said bottom;

transponder means associated with said device and suspended so as to be movable with said device between said surface and said bottom, said transponder means being adapted for producing second acoustic pulses each responsively to a first acoustic pulse received at said transponder means; and means at said station for timing the transmission of each first pulse and the arrival at said station of each second pulse and reflections of said pulses from said bottom.

6. Apparatus as defined by claim 5 wherein said means for timing includes means for recording the transmission of each first pulse, and the arrival of each second pulse and said reflections, all on a time base.

References Cited

UNITED STATES PATENTS

| | | | |
|---|---|---|---|
| 2,480,561 | 8/1949 | Ewing et al. | 340—3 |
| 3,119,092 | 1/1964 | Edgerton | 340—3 |
| 3,174,128 | 3/1965 | Dow et al. | 340—3 |

RICHARD A. FARLEY, *Primary Examiner.*

RODNEY D. BENNETT, *Examiner.*